UNITED STATES PATENT OFFICE.

JAMES CARREL DOBBINS, OF ROCK HILL, SOUTH CAROLINA.

PLASTIC COATING MATERIAL.

1,355,131.     Specification of Letters Patent.     Patented Oct. 12, 1920.

No Drawing.     Application filed October 29, 1919. Serial No. 334,215.

*To all whom it may concern:*

Be it known that I, JAMES CARREL DOBBINS, a citizen of the United States of America, residing at Rock Hill, in the county of York and State of South Carolina, have invented certain new and useful Improvements in Plastic Coating Material, of which the following is a specification.

My present invention relates to a material for use in plastic coating processes, and more particularly to a material adapted for use on fabrics, walls, etc., for filling, stiffening and giving a finished appearance to plaster, cement, clay or other mineral surfaced walls.

The primary object of the invention is the provision of a coating or composition for this purpose, which is water proof, and may be applied to a wall with facility and despatch and is then ready and in prime condition to be stippled in order to give to the wall or surface the appearance of sand paper, or other analogous material.

The invention consists essentially in mixing certain ingredients into a paste formation or condition, which may be applied to a wall with a brush or broom, and then stippled before drying.

In the following specification I have illustrated one example of the physical embodiment of my invention mixed according to the best mode I have so far devised for the practical application of the principles of my invention.

In carrying out the process to produce my improved composition I utilize various powdered ingredients which, after being mixed together, are then mixed with a liquid ingredient.

The powdered ingredients have for their base pure ordinary Portland cement or white cement, to which is added hydrated lime, ground mica, and a mineral color to give the desired shade.

I find that the following formula for the powdered ingredients is satisfactory and gives good results:

100 pounds pure Portland cement,
13 pounds hydrated lime,
1 pound mineral color,
5 ounces ground mica.

These ingredients in their proper proportion are placed in a vessel and thoroughly mixed or commingled into a homogeneous powder which is mixed with the following liquid formula in order to form a paste:—

The liquid formula contains—

8 quarts of water,
8 quarts of an aqueous solution of sodium silicate, or what is known as water glass, generally having a specific gravity of 1.7.

The water and silicate of soda are poured into a vessel and thoroughly mixed, and then the solution is poured into the mixture of powdered ingredients contained in a vessel. As the liquid formula is poured into the powdered ingredients the entire mass is stirred continuously, until the entire quantity has been mixed to the consistency of paste when it is ready for application to the wall, canvas, or other surface that is to be sized.

In applying the paste to a cement, plaster, clay or other mineral surface, it is preferred to use a broom or brush, such as for instance a whisk-broom. The whisk-broom may be dipped into a bucket of the paste and then slapped broadside against the surface to be coated and this slapping process is repeated until approximately four or five square feet of surface have been covered with the paste while it is in rather more than a plastic condition. The surface which has thus been coated is now stippled or hammered with the brush, using preferably a brush of the nature of the ordinary scrubbing brush, and applying the ends of the bristles to the paste that has been laid on the surface. The effect of this stippling is to produce a uniform, but rough finish or coating on the surface being covered, the appearance of the wall being somewhat similar to that of sand paper, or a smooth troweled surface may be effected where desired, and in some instances the effect of artificial marble may be produced, and it will be found that the coating is waterproof so that it may be washed when required, and presents a plain but ornamental and pleasing effect to the eye.

Claims:—

1. A coating material of paste form, containing cement, hydrated lime, mineral color, ground mica, water and sodium silicate.

2. A coating material in the nature of a paste, comprising approximately 100 pounds of Portland cement, 13 pounds hydrated lime, 1 pound mineral color, 5 ounces ground mica, 8 quarts of water and 8 quarts of aqueous solution of sodium silicate.

In testimony whereof I affix my signature.

JAMES CARREL DOBBINS.